(12) United States Patent
Lin et al.

(10) Patent No.: US 8,690,347 B2
(45) Date of Patent: Apr. 8, 2014

(54) COOLING DEVICE AND PROJECTION DEVICE COMPRISING THE SAME

(75) Inventors: Chia-Jui Lin, Taoyuan Hsien (TW); Hsiu-Ming Chang, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 27 days.

(21) Appl. No.: 13/316,873

(22) Filed: Dec. 12, 2011

(65) Prior Publication Data
US 2012/0154761 A1  Jun. 21, 2012

(30) Foreign Application Priority Data

Dec. 17, 2010  (TW) .............................. 99144353 A

(51) Int. Cl.
*G03B 21/18*  (2006.01)

(52) U.S. Cl.
USPC ............... 353/58; 353/52; 353/57; 353/60; 353/61; 349/5; 349/7; 362/364; 362/294

(58) Field of Classification Search
USPC .......... 353/57–58, 60–61; 362/264, 294, 373; 349/5, 7–9
See application file for complete search history.

(56) References Cited

U.S. PATENT DOCUMENTS

| | | | |
|---|---|---|---|
| 7,029,123 B2 * | 4/2006 | Gishi et al. ....................... | 353/57 |
| 7,237,905 B2 | 7/2007 | Yajima et al. | |
| 7,425,793 B2 * | 9/2008 | Haga et al. ....................... | 313/46 |
| 7,607,782 B2 | 10/2009 | Chen et al. | |
| 7,938,544 B2 * | 5/2011 | Chou et al. ....................... | 353/61 |
| 2002/0197158 A1 | 12/2002 | Hsu et al. | |
| 2005/0264766 A1 | 12/2005 | Morimoto et al. | |
| 2008/0231812 A1 * | 9/2008 | Sakai et al. ....................... | 353/58 |
| 2008/0246896 A1 * | 10/2008 | Zheng et al. ....................... | 349/5 |
| 2009/0135378 A1 * | 5/2009 | Lin et al. ....................... | 353/61 |
| 2009/0207382 A1 * | 8/2009 | Hsiao et al. ....................... | 353/58 |

FOREIGN PATENT DOCUMENTS

| | | |
|---|---|---|
| JP | 200865326 A | 3/2008 |
| TW | 200640355 A | 11/2006 |
| TW | 200510909 A | 7/2007 |

OTHER PUBLICATIONS

Office Action for Taiwanese Application No. 099144353; Date of Mailing: Jul. 23, 2013; with English Translation.

* cited by examiner

*Primary Examiner* — Sultan Chowdhury
(74) *Attorney, Agent, or Firm* — Cantor Colburn LLP

(57) ABSTRACT

A cooling device and a projection device comprising the same are provided. The projection device comprises a lamp and a cooling device. The lamp has a first side and a second side opposite the first side, and one of the two sides is the upper side of the lamp. The cooling device comprises a first blower and a second blower. The first blower is adapted to generate a first airflow towards the first side, while the second blower is adapted to generate a second airflow towards the second side.

10 Claims, 5 Drawing Sheets

COOLING DEVICE AND PROJECTION DEVICE COMPRISING THE SAME

This application claims priority to Taiwan Patent Application No. 099144353 filed on Dec. 17, 2010, the disclosures of which are incorporated herein by reference in their entirety.

CROSS-REFERENCES TO RELATED APPLICATIONS

Not applicable.

BACKGROUND OF THE INVENTION

1. Field of the Invention

The present invention provides a cooling device for a projection device, and more particularly, to a cooling device that can generate and guide airflow of various intensities to cool the lamps.

2. Descriptions of the Related Art

Power levels have increased to accommodate the increased improvement of projector luminance. As a result, lamps may generate intensive heat during operation, which produce hot gasses that are concentrated in the upper area of the lamps. To solve the problem of overheating, a cooling device is usually disposed inside the projector to cool the lamp to reduce the damage to the internal parts caused by excessively high temperatures.

As shown in FIG. 1A, the cooling device 2 of a projector 1 of the prior art comprises a blower 20 in combination with an airflow guiding plate 21 and is adapted to generate an airflow 201, an airflow 202 and an airflow 203 towards the front end 11, lamp wick 12 and back end 13 of the lamp 10 respectively. With further reference to FIG. 1B, when the projector 1 is used upright (e.g., on a table), hot gasses inside the lamp 10 are concentrated towards the first sidewall 101 so that the first sidewall 101 of the lamp 10 is at a higher temperature and the second sidewall 102 of the lamp 10 is at a lower temperature. Because the blower 20 is located above the lamp 10, the airflows 201, 202 and 203 generated by the blower 20 can cool the temperature of the first sidewall 101 of the lamp 10 easily. However, although this can make the temperature difference between the first sidewall 101 and the second sidewall 102 of the lamp 10 relatively small, it is still not enough to cool down the temperature of the high-power lamp 10. Moreover, as shown in FIG. 1C, when the projector 1 is used upside down (e.g., hung from a ceiling), the hot gasses inside the lamp 10 are concentrated toward the second sidewall 102 so that the second sidewall 102 of the lamp 10 is at a higher temperature and the first sidewall 101 of the lamp 10 is at a lower temperature. Because the blower 20 is located below the lamp 10, the airflows 201, 202 and 203 from the blower 20 are unable to cool the second sidewall 102 of the lamp 10 directly, which results in an increased temperature difference between the first sidewall 101 and the second sidewall 102 of the lamp 10 instead. The undue temperature difference has a serious effect on the service life of the lamp 10; furthermore, when a high-power lamp is used, the rotating speed of the blower has to be increased to lower the temperature of the lamp, and this will lead to excessive noise.

To overcome the shortcomings of using a single blower, the cooling device 2 of another projector 1 of the prior art adopts a dual-blower framework to tackle the problem of high temperatures in the lamp 10. As shown in FIG. 2A, the blower 20 is used in combination with the airflow guiding plate 21 and generates the airflow 202 and the airflow 203 towards the lamp wick 12 and the back end 13 of the lamp 10 respectively; and the other blower 22 is used in combination with an airflow guiding plate 23 and generates an airflow 221 towards the front end 11 of the lamp 10. This framework can desirably lower the temperature of a high-power lamp. With further reference to FIG. 2B, when the projector 1 is used upside down (e.g., hung from a ceiling), the front end 11 of the lamp 10 can still be desirably cooled by the airflow 221 of the blower 22 without being affected, but the hot gasses inside the lamp 10 are concentrated towards the second sidewall 102 of the lamp 10 so that the second sidewall 102 of the lamp 10 is at a higher temperature and the first sidewall 101 of the lamp 10 is at a lower temperature. In addition, the blower 20 is located below the lamp 10, so neither the airflow 202 nor the airflow 203 of the blower 20 can cool the second sidewall 102 of the lamp 10 directly. Consequently, the temperature difference between the first sidewall 101 and the second sidewall 102 of the lamp 10 increases and leads to a non-uniform temperature distribution at the filament 12 and the back end 13, which also has an adverse effect on the service life of the lamp 10.

In view of this, an urgent need exists in the art to provide a solution that can not only reduce the temperature of the front end and the wick of a lamp effectively, but also minimize the temperature difference between the upper side and the lower side of the lamp by controlling the intensities of airflow no matter how the projector is used.

SUMMARY OF THE INVENTION

An objective of the present invention is to provide a cooling device for a projection device. The projection device comprises a lamp which has a first side and a second side opposite the first side, and either the first side or the second side of the lamp is located at the upper side of the lamp. The cooling device comprises a first blower and a second blower. The first blower is adapted to generate a first airflow towards the first side of the lamp; and the second blower is adapted to generate a second airflow towards the second side of the lamp.

Another objective of the present invention is to provide a projection device. The projection device comprises a lamp and a cooling device. The lamp has a first side and a second side opposite the first side, and either the first side or the second side of the lamp is located at the upper side of the lamp. The cooling device comprises a first blower and a second blower. The first blower is adapted to generate a first airflow towards the first side of the lamp; and the second blower is adapted to generate a second airflow towards the second side of the lamp.

According to the above descriptions, by generating airflows of different intensities towards the upper side and the lower side of a lamp respectively and particularly by enhancing the heat dissipation of the upper side of the lamp, the cooling device of the present invention can minimize the temperature difference between the upper side and the lower side of the lamp when the projection device is disposed in different manners (e.g., disposed on a table upright or hung from a ceiling upside down). In this way, the service life of the lamp is prolonged.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
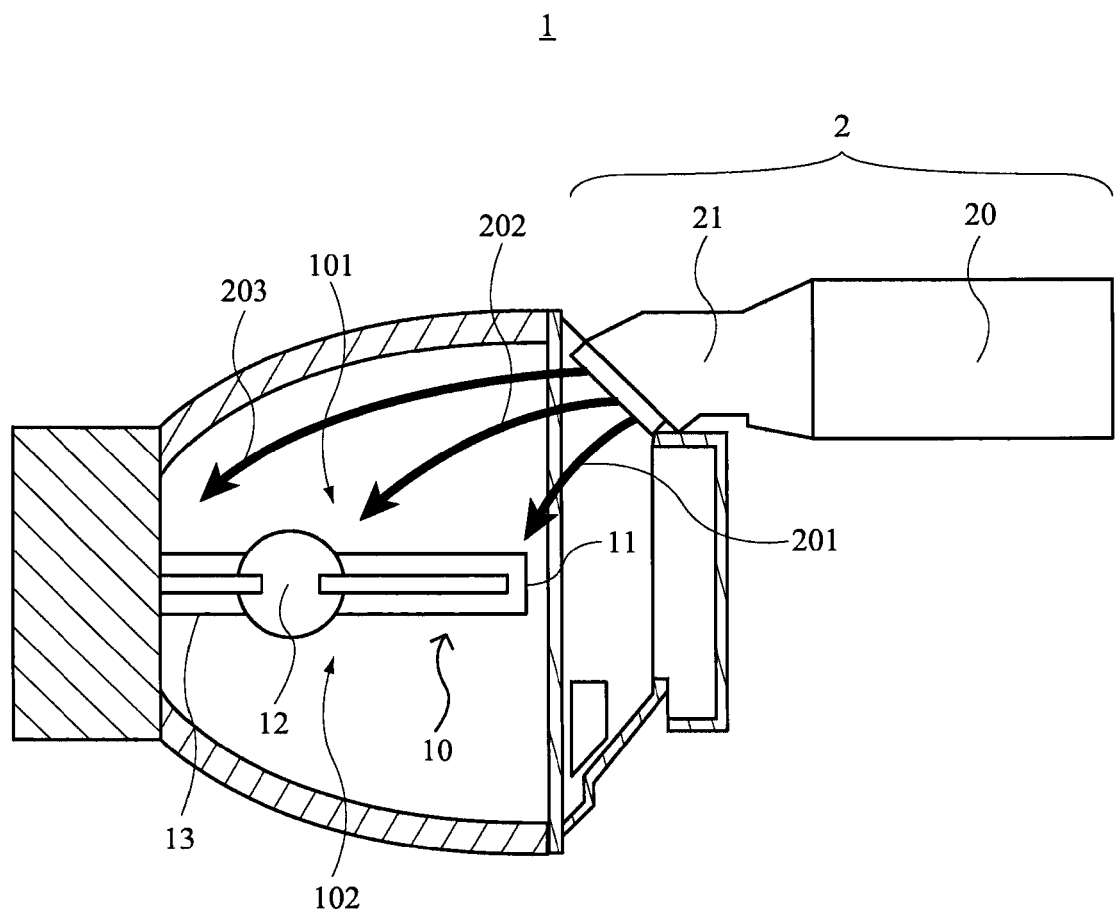
FIG. 1A is a schematic side view illustrating a lamp of the prior art projector and a single blower of a cooling device.
Figure 1B:
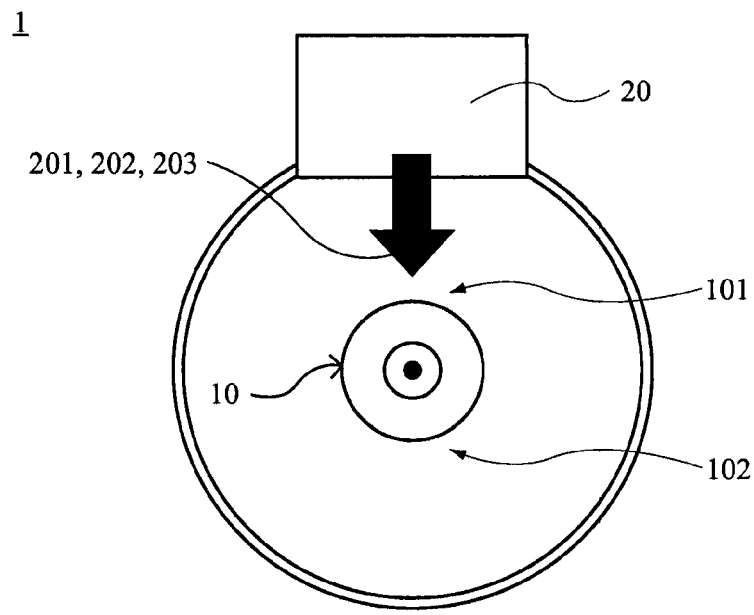
FIG. 1B is a schematic view of airflows of the single blower when the prior art projector is disposed upright.
Figure 1C:
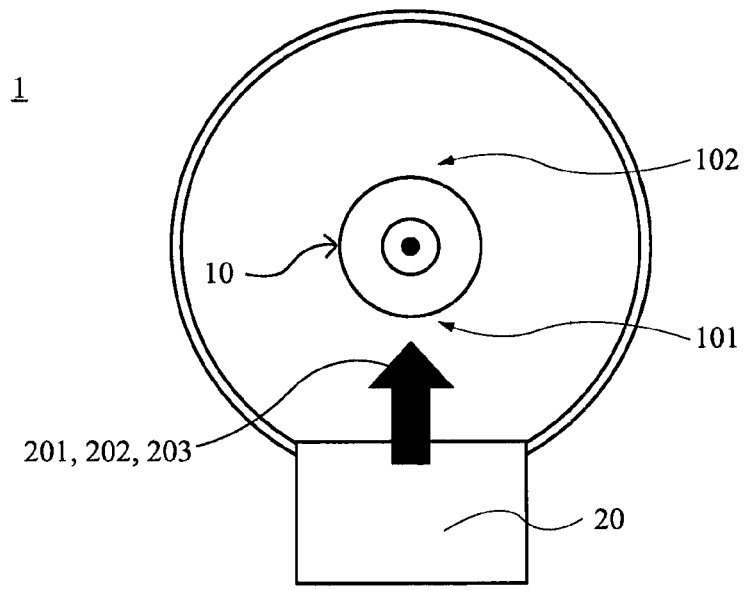
FIG. 1C is a schematic view of the airflows of the single blower when the prior art projector is disposed upside down.
Figure 2A:
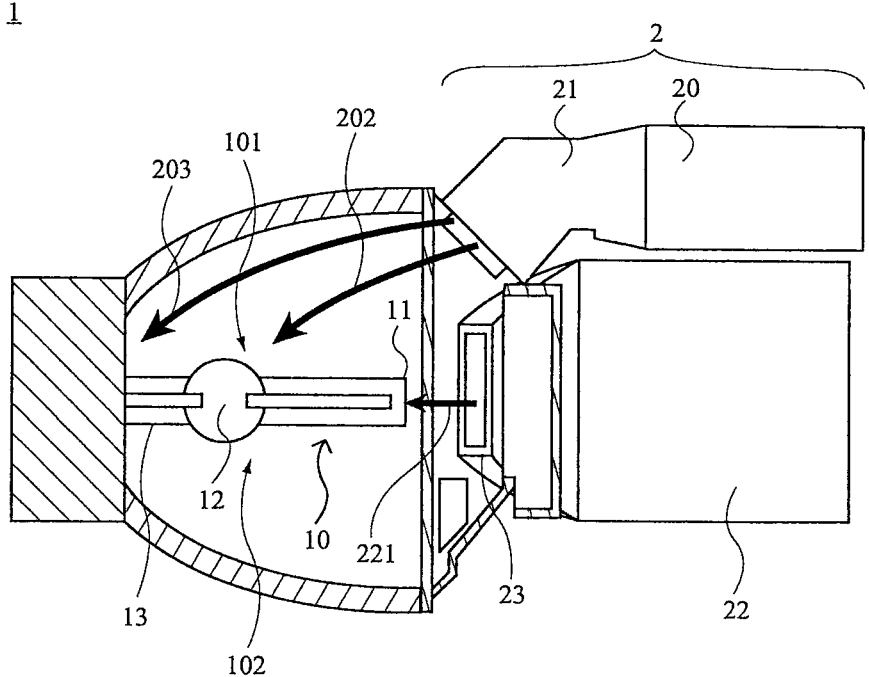
FIG. 2A is a schematic side view of airflows of dual blowers when the prior art projector is disposed upright.
Figure 2B:
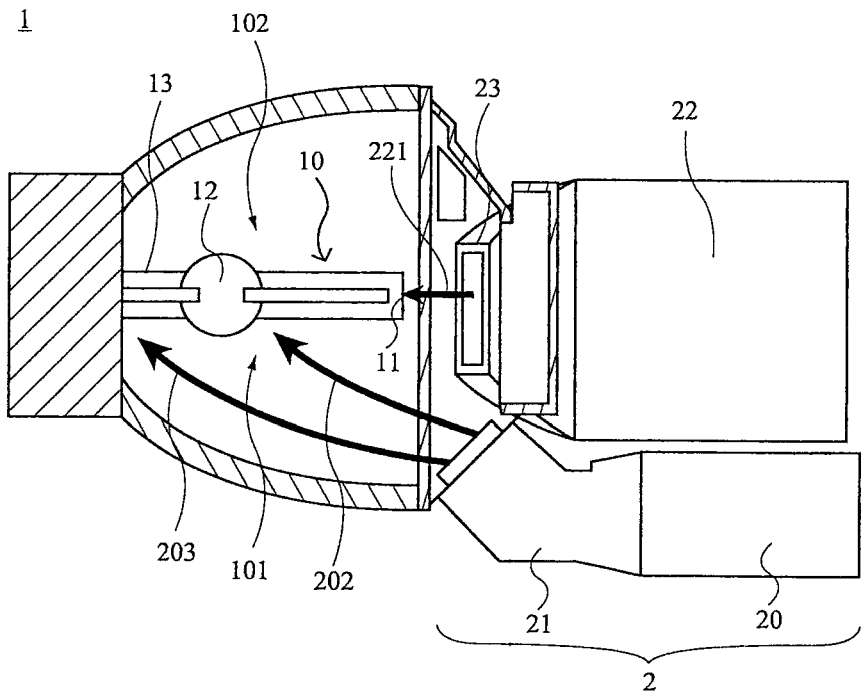
FIG. 2B is a schematic side view of the airflows of the dual blowers when the prior art projector is disposed upside down.
Figure 3:
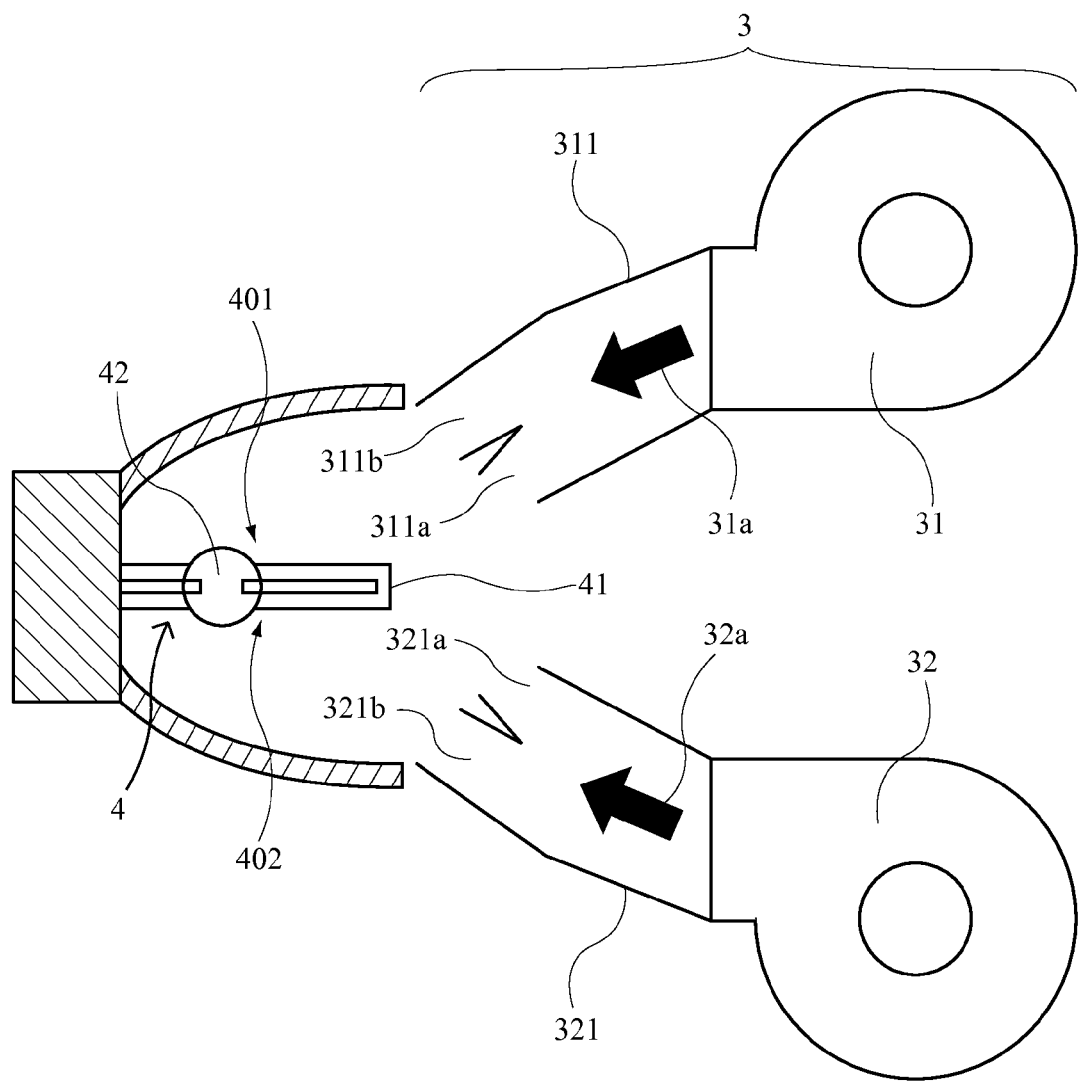
FIG. 3 is a schematic side view of a lamp and a cooling device according to the present invention.

In reference to FIG. 3, a projection device 5 of the present invention comprises a lamp 4 and a cooling device 3. The lamp 4 can be divided into a front end 41 and a lamp wick 42, while the cooling device 3 comprises a first blower 31 and a second blower 32. The first blower 31 is adapted to generate a first airflow 31a towards the first side 31 of the lamp 4, while the second blower 32 is adapted to generate a second airflow 32a towards the second side 32 of the lamp 4. The lamp 4 further defines the first side 401 and second side 402 opposite the first side 401, and either the first side 401 or the second side 402 is an upper side 43 of the lamp 4. Thereby, the first airflow 31a generated by the first blower 31 flows towards the direction of the first side 401 of the lamp 4; and the second airflow 32a generated by the second blower 32 flows towards the direction of the second side 402 of the lamp 4.

Moreover, to obtain a desirable cooling effect, airflow guiding pipes are usually installed on the blowers by those of ordinary skill in the art to guide and deflect airflows generated by the blowers to different locations of lamps. In this embodiment, a first airflow guiding pipe 311 is disposed between the first blower 31 and the first side 401 to guide the first airflow 31a; and a second airflow guiding pipe 321 is disposed between the second blower 32 and the second side 402 to guide the second airflow 32a. In addition, the first airflow guiding pipe 311 has two airflow outlets 311a and 311b which are installed to face the front end 41 and the lamp wick 42 respectively; while the second airflow guiding pipe 321 of the second blower 32 has two airflow outlets 321a and 321b which are installed to face toward the front end 41 and the lamp wick 42 respectively.

During the actual operation, the first airflow 31a generated by the first blower 31 and the second airflow 32a generated by the second blower 32 are simultaneously transmitted to the front end 41 and the wick 42 of the lamp 4 through the two airflow outlets 311a and 311b of the first airflow guiding pipe 311 and the two airflow outlets 321a and 321b of the second airflow guiding pipe 321 respectively. In this way, the temperature of the lamp 4 can be cooled uniformly.

Figure 4A:
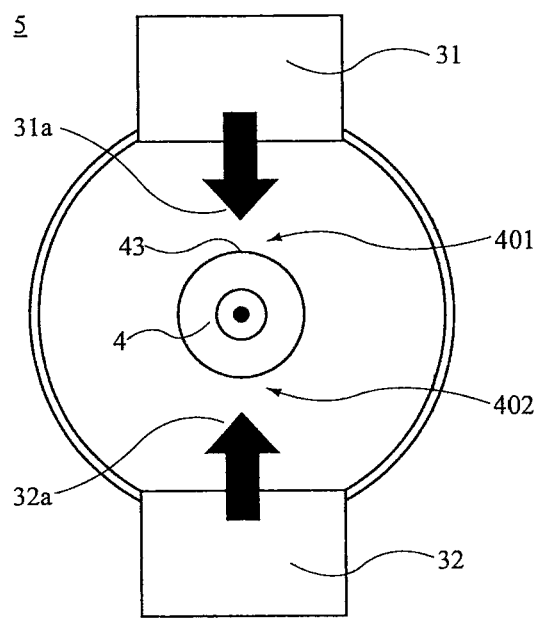
FIG. 4A is a schematic view of airflows of the cooling device according to the present invention when a projection device is disposed upright.
Figure 4B:
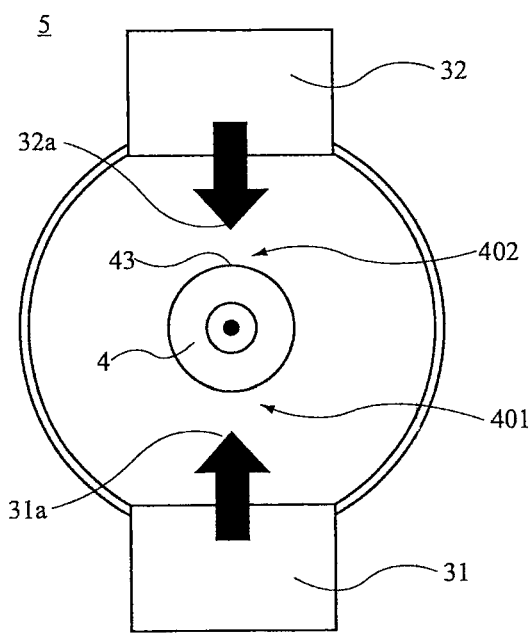
FIG. 4B is a schematic view of the airflows of the cooling device according to the present invention when the projection device is disposed upside down.

In view of the fact that hot gasses inside the lamp 4 tend to be concentrated towards the upper side 43 of the lamp 4, the intensities of the different airflows are controlled to obtain a desirable cooling effect at the upper side 43 of the lamp 4. In this embodiment, in reference to FIG. 4A (where the projection device 5 is disposed upright on a table), the first side 401 of the lamp 4 is located at the upper side 43 of the lamp 4; and in this case, the first airflow 31a generated by the first blower 31 is controlled to be stronger than the second airflow 32a generated by the second blower 32. In contrast, as shown in FIG. 4B (where the projection device 5 is hung from a ceiling upside down), the second side 402 of the lamp 4 is located at the upper side 43 of the lamp 4; and in this case, the second airflow 32a generated by the second blower 32 is controlled to be stronger than the first airflow 31a generated by the first blower 31. Therefore, no matter whether the projection device 5 is disposed upright (e.g., on a table) or upside down (e.g., hung from a ceiling), airflows blown to the upper side of the lamp 4 is always stronger than those blown to the lower side of the lamp 4. This leads to a small temperature difference between the first side 401 and the second side 402 of the lamp 4, thus prolonging the service life of the lamp 4 more effectively.

In this embodiment, the cooling device 3 may further comprise a tilt sensor 34 or an On-Screen Display (OSD) controller 35 (not shown) for determining which of the first side 401 and the second side 402 is located at the upper side 43 of the lamp 4 and operating the first blower 31 and the second blower 32 of the lamp 4 to control the intensities of the first airflow 31a generated by first blower 31 and the second airflow 32a generated by a second blower 32. In this way, the orientation in which the projection device 5 is disposed can be determined to strengthen the intensity of the airflows blown to the upper side 43 of the lamp 4.

According to the above descriptions, apart from cooling the front end and the lamp wick of the lamp, the cooling device of the present invention can also particularly enhance the heat dissipation effect at the upper side of the lamp by controlling the intensities of the airflows blown toward the upper side depending on the orientation in which the projection device is disposed. In this way, the temperature difference between the upper side and the lower side of the lamp is minimized and, consequently, the service life of the lamp is prolonged.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A cooling device for a projection device, wherein the projection device comprises a lamp which has a lamp wick, a front end, a first side and a second side opposite to the first side, and one of the first side and the second side of the lamp is located at an upper side of the lamp, the cooling device comprising:

a first blower for generating a first airflow toward the first side of the lamp;

a first airflow guiding pipe having two airflow outlets and disposed between the first blower and the first side of the lamp to guide the first airflow, wherein one of the airflow outlets is installed toward the lamp wick and the other is toward the front end of the lamp; and a second blower for generating a second airflow toward the second side of the lamp.

2. The cooling device as claimed in claim 1, wherein the cooling device further comprises:

a second airflow guiding pipe disposed between the second blower and the second side to guide the second airflow.

3. The cooling device as claimed in claim 2, wherein the second airflow guiding pipe has two airflow outlets, one of which is installed toward the lamp wick and the other is toward the front end.

4. The cooling device as claimed in claim 3, wherein the first airflow is controlled to be stronger than the second airflow when the first side is located at the upper side of the lamp, and wherein the second airflow is controlled to be stronger than the first airflow when the second side is located at the upper side of the lamp.

5. The cooling device as claimed in claim 4, wherein the cooling device further comprises a tilt sensor or an On-Screen Display (OSD) controller which is capable of determining which of the first side and the second side is located at the upper side of the lamp, and operating the first blower and the second blower to control the first airflow and the second airflow.

6. A projection device, comprising:
   a lamp having a lamp wick, a front end, a first side and a second side opposite to the first side, and one of the first side and the second side of the lamp is located at an upper side of the lamp; and
   a cooling device as claimed in claim 1.

7. The cooling device as claimed in claim 6, wherein the cooling device further comprises:
   a second airflow guiding pipe disposed between the second blower and the second side to guide the second airflow.

8. The cooling device as claimed in claim 7, wherein the second airflow guiding pipe has two airflow outlets, one of which is installed toward the lamp wick and the other is toward the front end.

9. The cooling device as claimed in claim 8, wherein the first airflow is controlled to be stronger than the second airflow when the first side is located at the upper side of the lamp, and wherein the second airflow is controlled to be stronger than the first airflow when the second side is located at the upper side of the lamp.

10. The cooling device as claimed in claim 9, wherein the cooling device further comprises a tilt sensor or an On-Screen Display (OSD) controller which is capable of determining which of the first side and the second side is located at the upper side of the lamp, and operating the first blower and the second blower to control the first airflow and the second airflow.

* * * * *